United States Patent
Bostick et al.

(10) Patent No.: US 10,037,030 B2
(45) Date of Patent: Jul. 31, 2018

(54) DIRECTING MOVEMENT OF SELF-DRIVING VEHICLES IN A DELINEATED VEHICULAR AREA

(71) Applicant: International Business Machines Corporation, Armonk, NY (US)

(72) Inventors: James E. Bostick, Cedar Park, TX (US); John M. Ganci, Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/162,861

(22) Filed: May 24, 2016

(65) Prior Publication Data

US 2017/0344003 A1  Nov. 30, 2017

(51) Int. Cl.
*G05D 1/00*   (2006.01)

(52) U.S. Cl.
CPC ......... *G05D 1/0033* (2013.01); *G05D 1/0027* (2013.01); *G05D 1/0088* (2013.01)

(58) Field of Classification Search
None
See application file for complete search history.

(56) References Cited

U.S. PATENT DOCUMENTS

| 2007/0040701 A1* | 2/2007 | Browne | G08G 1/143 |
| | | | 340/932.2 |
| 2008/0136674 A1* | 6/2008 | Jang | G08G 1/14 |
| | | | 340/932.2 |
| 2016/0306535 A1* | 10/2016 | Krishnamoorthy | G06T 7/73 |
| 2016/0307039 A1* | 10/2016 | Krishnamoorthy | G06T 7/73 |
| 2016/0371607 A1* | 12/2016 | Rosen | G06Q 10/02 |
| 2017/0092130 A1* | 3/2017 | Bostick | G08G 1/143 |

\* cited by examiner

*Primary Examiner* — Redhwan K Mawari
*Assistant Examiner* — Edward Torchinsky
(74) *Attorney, Agent, or Firm* — John R. Pivnichny; Law Office of Jim Boice

(57) ABSTRACT

A method, system, and/or computer program product controls movement of one or more self-driving vehicles within a delineated vehicular area. One or more processor(s) receive an image of a vehicular area in which self-driving vehicles are authorized to travel, which is displayed on a display. Processor(s) receive an input defining a delineated area of the vehicular area on the display, and retrieve a ruleset related to movement of self-driving vehicles within the delineated area. Processor(s) then transmit movement instructions to one or more self-driving vehicles within the delineated area in accordance with the ruleset.

9 Claims, 7 Drawing Sheets

DIRECTING MOVEMENT OF SELF-DRIVING VEHICLES IN A DELINEATED VEHICULAR AREA

BACKGROUND

The present disclosure relates to the field of vehicles, and specifically to the field of self-driving vehicles. Still more specifically, the present disclosure relates to the field of controlling the movement of self-driving vehicles in a defined vehicular area.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A method, system, and/or computer program product controls movement of one or more self-driving vehicles within a delineated vehicular area. One or more processor(s) receive an image of a vehicular area in which self-driving vehicles are authorized to travel, which is displayed on a display. Processor(s) receive an input defining a delineated area of the vehicular area on the display, and retrieve a ruleset related to movement of self-driving vehicles within the delineated area. Processors then transmit movement instructions to one or more self-driving vehicles within the delineated area in accordance with the ruleset.

DETAILED DESCRIPTION

Figure 1:
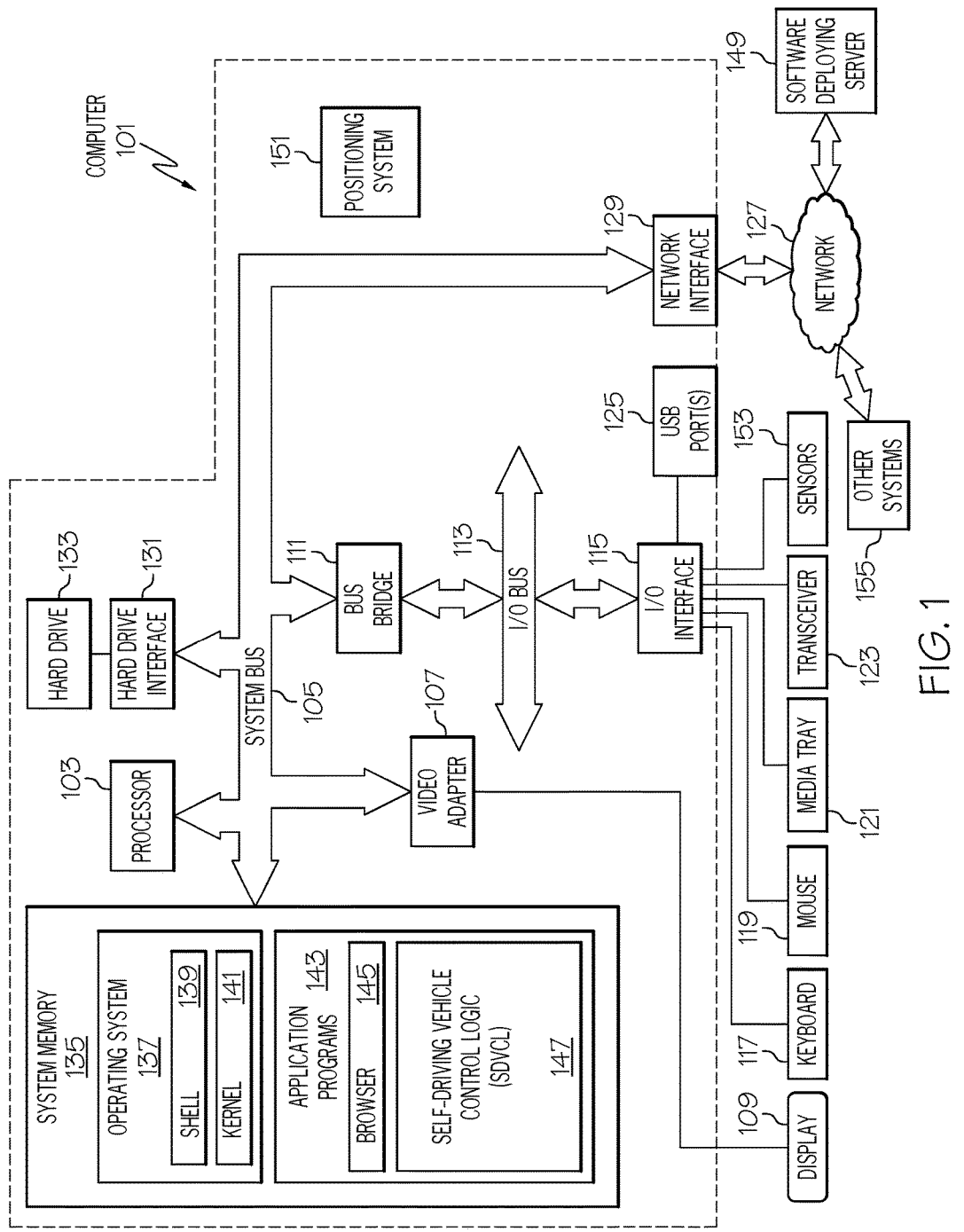
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or self-driving vehicle (SDV) controller 201 shown in FIG. 2, and/or a self-driving vehicle (SDV) on-board computer 301 shown in FIG. 3, and/or a user device 455 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other systems 155 (e.g., establishing communication among SDV 202, SDV controller 201, etc. as described and depicted in the figures herein) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Control Logic (SDVCL) 147. SDVCL 147 includes code for implementing the processes described below, including those described in FIGS. 2-5. In one embodiment, computer 101 is able to download SDVCL 147 from software deploying server 149, including in an on-demand basis, wherein the code in SDVCL 147 is not downloaded until needed for execution. In one embodiment of the present invention, software deploying server 149 performs all of the functions associated with the present invention (including execution of SDVCL 147), thus freeing computer 101 from having to use its own internal computing resources to execute SDVCL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV) (e.g., SDV on-board computer 301 shown in FIG. 3), then sensors 153 may be cameras, radar transceivers, etc. that allow the SDV to detect the environment (e.g., road obstructions, pavement, conditions, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling, as well as the SDVs and parking spaces in a parking lot, such as shown in FIG. 4.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
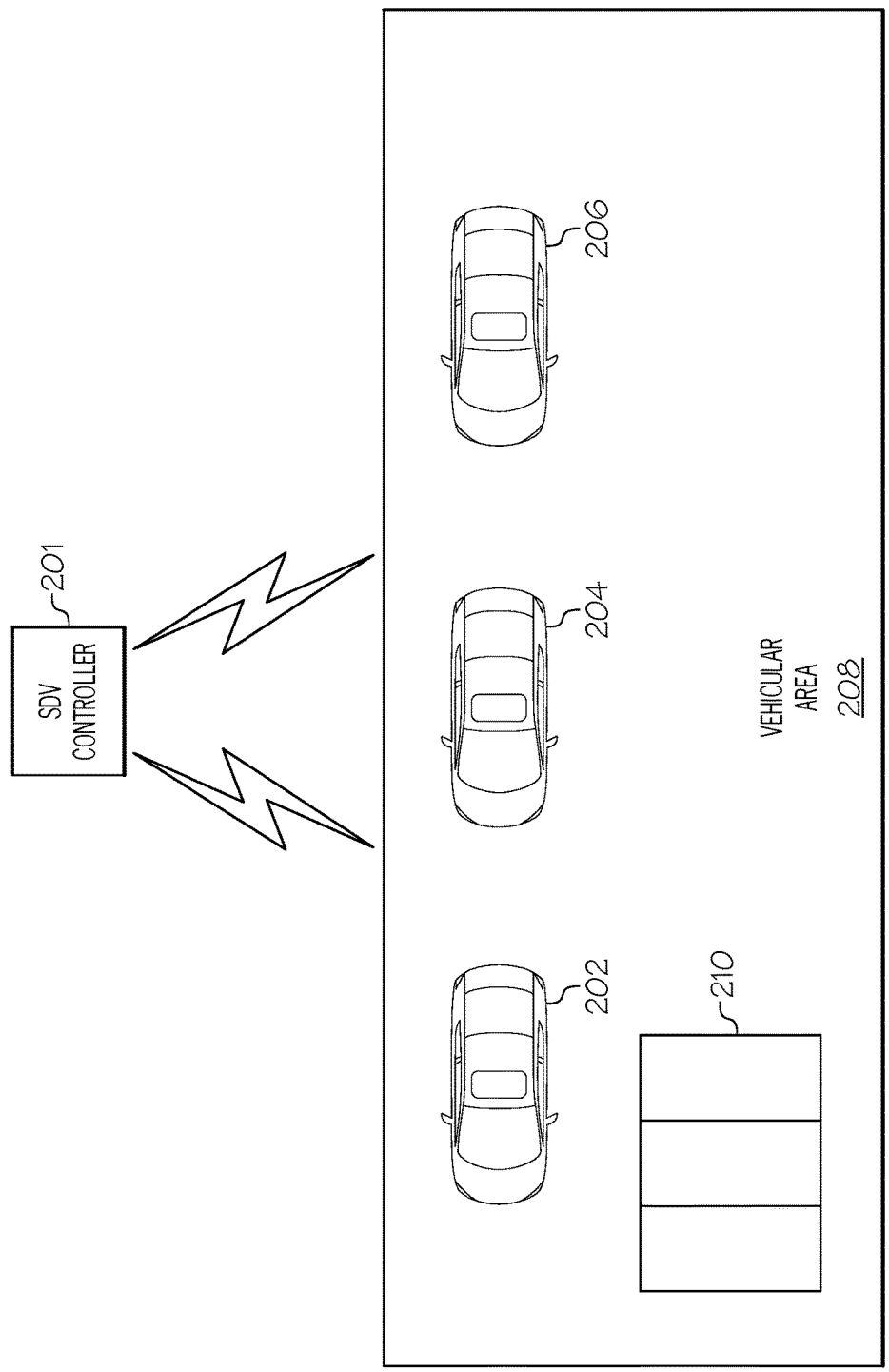
FIG. 2 illustrates a relationship between a self-driving vehicle (SDV) controller and one or more SDVs within a vehicular area in accordance with one or more embodiments of the present invention.

With reference now to FIG. 2, assume that a self-driving vehicle (SDV) controller 201 is able to direct the movement of one or more SDVs, depicted as SDV 202, SDV 204, and SDV 206. While three SDVs are depicted in FIG. 2, it is to be understood that the present invention contemplates controlling more or fewer than three SDVs in various embodiments.

As shown in FIG. 2, SDVs 202/204/206 are in a vehicular area 208. Vehicular area 208 is any physical area upon which an SDV is capable of driving. For example, vehicular area 208 may be a parking lot, a parking garage, a street, a highway, a dirt road, etc. As described herein, the present invention utilizes the SDV controller 201 to control movement of SDVs 202/204/206 within delineated area(s) in the vehicular area 208.

For example, assume that vehicular area 208 is a parking lot, and that within delineated area 210 are three particular parking spots. In accordance with one or more embodiments of the present invention, use of these three parking spots by SDVs (e.g., SDVs 202/204/206) is controlled by SDV controller 201 according to certain rules regarding the use of these parking spots (e.g., by certain types of SDVs, at certain times, by certain users, etc.).

For example, SDV controller 201 may limit use of the parking spots in delineated area 210 to only passenger-carrying SDVs, at only certain times of the day (e.g., between 9:00 am and 5:00 pm Monday through Friday), for only one hour at a time, etc. If an SDV is not in conformance (i.e., is not the right type of SDV, has been in a parking spot for too long, etc.), then that SDV will be directed by SDV controller 201 to vacate the delineated area 210 (or else not be allowed to enter the delineated area 210 in the first place).

Figure 3:
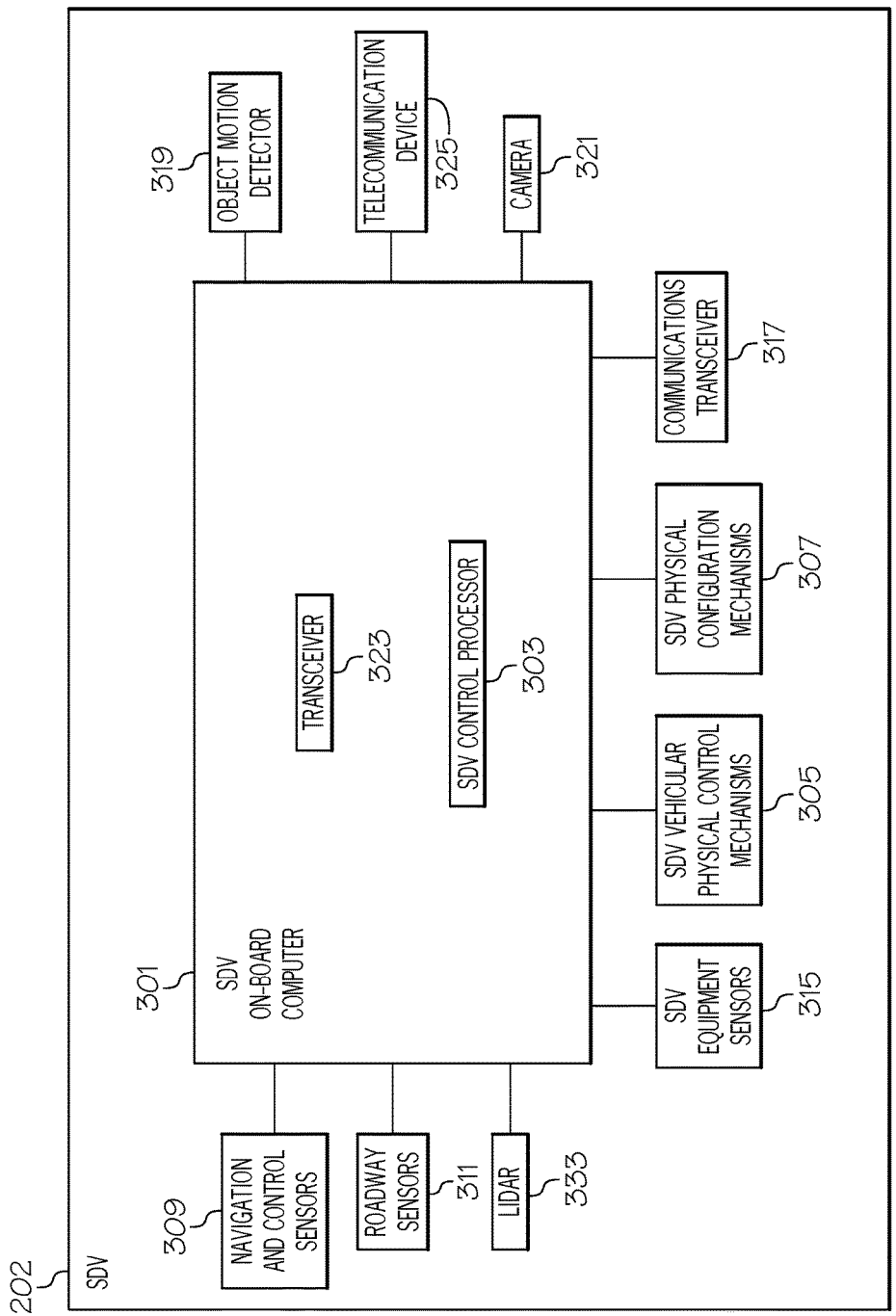
FIG. 3 depicts additional detail of hardware within an exemplary SDV.
Figure 4:
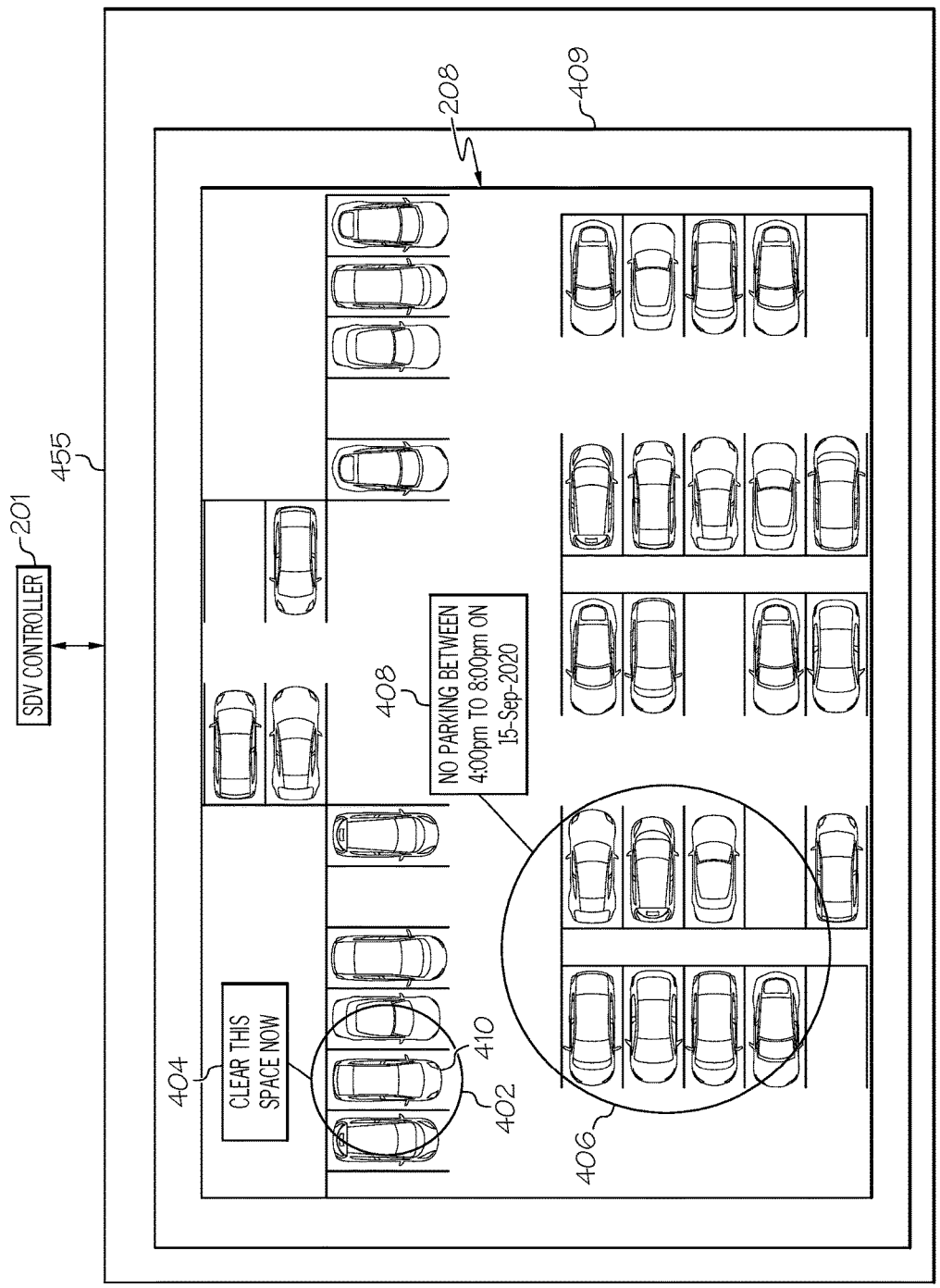
FIG. 4 illustrates an exemplary user interface on a user device for delineating a portion of a vehicular area in order to control SDVs according to rules for the delineated area.

With reference now to FIG. 3, additional detail of components within an SDV such as exemplary SDV 202 are presented. As shown in FIG. 3, SDV 202 has an SDV on-board computer 301 that controls operations of the SDV 202. Thus, SDV controller 201 shown in FIG. 2 is wirelessly coupled to the SDV on-board computer 301 in order to be able to control the movement and operation of SDV 202. While in autonomous mode, SDV 202 operates without the input of a human driver, such that the engine, steering mechanism, braking system, horn, signals, etc. are controlled by the SDV control processor 303, which is under the control of the SDV on-board computer 301 (based on instructions provided by SDV controller 201). That is, by the SDV on-board computer 301 processing driving instructions received (e.g., from the SDV controller 201 shown in FIG. 2) by a communications transceiver 317 and inputs taken from navigation and control sensors 309, then the SDV 202 is able to autonomously drive itself, including within the vehicular area 208 shown in FIG. 2 as dictated by such driving instructions.

Thus, communications transceiver 317 is able to receive and transmit electronic communication signals (e.g., RF messages) from and to other communications transceivers found in other vehicles, servers, monitoring systems, etc. This enables SDV control processor 303 to autonomously control SDV vehicular physical control mechanisms 305 (e.g., the engine throttle, steering mechanisms, braking systems, turn signals, etc.) on SDV 202.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., the same transceiver 323 that emitted the electromagnetic radiation). An exemplary positioning system within SDV 202 is a Light Detection and Ranging (LIDAR) (e.g., the depicted LIDAR 333) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on a roadway (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway is using light sensors.

Similarly, a dedicated camera 321 can be trained on an area around SDV 202, in order to recognize (e.g., the SDV on-board computer 301 using facial recognition that plots and matches points on a waiting person's face with plotted points for known persons), in order to pull up to a user who is waiting in or near the vehicular area 208 to be picked up by SDV 202.

Similarly, a dedicated object motion detector 319 (e.g., a radar transceiver capable of detecting Doppler shifts indicative of the speed and direction of movement of hand waving by the waiting user) can be trained on the area around the area in or nearby vehicular area 208 in which the user/passenger is waiting. For example, in one embodiment of the present invention delineated area 210 is a passenger pickup area. As such, the SDV controller 201 controls the movement of SDV in order to pick up their passengers at delineated area 210 (e.g., at a certain time).

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Such measurements are used in one or more embodiments of the present invention to determine whether a particular SDV is the appropriate SDV for picking up the user. That is, if the SDV is in poor condition (e.g., has a flat tire), then another SDV may be dispatched to pick up the user (e.g., at the delineated area 210 shown in FIG. 2).

In one or more embodiments of the present invention, also within SDV 202 is a telecommunication device 325, which is able to send messages to a telecommunication device (e.g., a computer such as the user device 455 shown in FIG. 4).

In one or more embodiments of the present invention, SDV 202 also includes SDV physical configuration mechanisms 307, which are under the control of the SDV on-board computer 301. Examples of SDV physical configuration mechanisms 307 are mechanisms that control seating configurations, doors being opened, trunks being opened, etc.

By utilizing one or more of the hardware devices described thus far, various embodiments of the present invention present a method and system by which autonomous vehicle administrators or operators can graphically draw actions on a map or video feed and provide written, typed, or spoken communications for the specific GPS locations which are interpreted by the system. This leads to the creation of rules and a workflow stored in a central database, resulting in communications from that same database to autonomous vehicles that obey these rules. Such rules can be time based, location based, and for specific or all autonomous vehicles.

As discussed above, autonomous vehicles are capable of controlling their own movement automatically. Autonomous vehicles can also receive commands from a central controller (e.g., SDV controller 201 shown in FIG. 2), which may be a cloud server (i.e., a real or virtual server than is available via a wide area network). As such, the present invention enables the system to control many autonomous vehicles (e.g., SDVs) remotely with a graphical user interface (GUI) based approach, so that a single operator or team of operators can control numerous autonomous vehicles in an efficient manner.

As described herein, various embodiments of the present invention enhance self-driving capabilities of SDVs by allowing a central control system (e.g., SDV controller 201 shown in FIG. 2) to recognize that a parking spot or parking spots in a parking lot that appear to be open may be figuratively blocked for usage by another SDV or set of SDVs, as communicated through drawing and teleprompting on a GUI (see FIG. 4 below) in combination with contextual awareness of meaning of words or times written by an operator.

Thus, the present invention allows the system to receive a GUI input (e.g., a circle drawn by a user around an area shown in a video feed) to control SDV movement within that area. Thus, the system interacts with input from a "pen" on the GUI, along with rule inputs, to determine how SDVs are moved within this area. That is, the present invention provides a system to inform SDVs and/or their controlling system that an unoccupied parking spot(s) is in fact blocked/reserved for usage by another SDV or set of SDVs, as communicated through drawing and teleprompting in combination with contextual awareness of meaning of words or times written by an operator/user of the GUI.

As described herein, instructions typed on the GUI (e.g., GUI 409 discussed below in FIG. 4) may be interpreted by the SDV controller 201 using natural language processing. That is, if the user types in "Clear this space now", then SDV controller 201 would "know" that the context of the instruction is a parking lot, such that "clear" means to vacate, and "space" means a parking space.

The present invention therefore presents a method and system by which autonomous vehicle administrators or operators can graphically draw actions in a remote server, resulting in autonomous vehicles that obey said rules. This is particularly useful for parking lots or parking lot sections that are created for autonomous vehicles only.

As described herein, operators can draw actions for autonomous vehicles and can jot down textual information. The SDV controller 201 (e.g., a cloud server) will perform contextual analysis of the written text and autonomous driving rules will be created. Any written rule can be understood including time and date based rules for any location or set of locations. Operators can also define workflow in the remote server, which can also detect time and/or event based scheduling. The workflow will be executed to the appropriate autonomous vehicles remotely.

As described herein, the present invention provides a GUI based interface that allows operators to circle areas on a map or video feed (corresponding to very specific GPS locations), while allowing the operators to add hand written notes (user-created, either in writing or through voice commands) that provide specific instructions for that given area. System intelligence is able to break down those instructions in such a way that they are understood by autonomous vehicles. The specific instructions (for a specific area, certain times, and/or certain SDVs) are stored as rulesets for future use.

With reference then to FIG. 4, an exemplary graphical user interface (GUI) 409 on a user device 455 (analogous to one of the other systems 155 shown in FIG. 1) depicts an image of a parking lot (e.g., vehicular area 208). As shown in FIG. 4, the image is captured from a video feed or other photographic image of the parking lot. Alternatively, the image may be a map of the parking lot, an illustration (drawing) of the parking lot, etc. The image may be from a real-time feed, or may be a saved older image of the parking lot.

As shown in FIG. 4, a user of the user device 455, which is communicatively coupled to SDV controller 201, has entered several inputs onto the GUI 409.

For example, the user has drawn a circle 402 on the GUI 409 to identify a single parking space on the parking lot. (It is understood that circle 402 and any other delineation marks input by the user may be any geometric shape.) In response to the user drawing the circle (on the GUI 409 itself if the GUI 409 is on a touch screen, otherwise from a touch pad, cursor movement using a mouse, etc.), the user device 455 prepares to receive instructions for the area delineated by circle 402. As shown in FIG. 4, an instruction box 404 appears, allowing the user to type (or to vocally enter) the instruction "Clear this space now". The user device 455 and/or SDV controller 201 interpret "Clear this space now" (e.g., using NLP to interpret the input based on the context of the parking lot) as an instruction to direct the SDV 410 shown in the delineated parking spot to move out of that spot (vacate that spot) immediately. As such, the SDV controller 201 and/or SDV on-board computer 301 within SDV 410 cause SDV 410 to immediately vacate the parking spot shown within circle 402.

In another embodiment, parking spaces are reserved by a combination of SDV movement and SDV blockage. For example, consider the delineated area marked by circle 406. In response to the user tracing circle 406 onto GUI 409, instructions are input by the user into instruction box 408 (by hand writing on the GUI 409, via a keyboard, by verbal inputs that are interpreted by speech-to-text logic within user device 455, etc.) stating "No parking between 4:00 pm to 8:00 pm on 15-Sep-2020". This input is both a direction to SDVs as well as a rule for the delineated area within circle 406. That is, this input is then interpreted and stored by SDV controller 201 as a rule prohibiting any specifically-authorized SDV from parking in this area between 4:00 pm and 8:00 pm on 15 Sep. 2020, as well as instructions to any SDVs already in that area to vacate the area before this time/date.

Thus, as shown in FIG. 4, the user (operator) of user device 455 is able to draw simple diagrams and related text directly on the video screen or picture, and accordingly the correct set of information pertaining to a rule will be sent to a cloud server (e.g., SDV controller 201). The cloud server will communicate this information directly to any and all autonomous vehicles (SDVs) through a wireless communications mechanism (e.g., a wireless version of network 127 shown in FIG. 1).

While FIG. 4 depicts SDVs being prohibited from occupying certain areas defined by the user, in another embodiment the invention can interpret inputs onto the GUI 409 as a requirement that certain SDVs be at a certain location (at a certain time). For example, assume that instead of the user entering the instruction "No parking between 4:00 pm to 8:00 pm on 15-Sep.-2020", the user had typed in "Bring SDVs 202/204/206 to this area by 4:00 pm on 15-Sep.-2020". This instruction would be interpreted (using NLP) by the SDV controller 201 as an instruction to 1) clear the parking spaces within circle 406 and 2) direct SDVs 202/204/206 to that area by 4:00 pm on 15 Sep. 2020. As such, SDV controller 201 will 1) send instructions to the SDV on-board controllers 301 on each of the SDVs within the delineated area defined by circle 406 to vacate the area by 4:00 pm on 15 Sep. 2020; 2) send instructions to the SDV on-board controllers 301 on any other SDVs in the area blocking these other SDVs from parking within the delineated area defined by circle 406 after 4:00 pm on 15 Sep. 2020; and 3) send instructions to the SDV on-board controllers 301 on SDVs 202/204/206 to drive to the delineated area defined by circle 406 by 4:00 pm on 15 Sep. 2020.

In a preferred embodiment, the embodiment in which SDVs are directed to meet at a certain location is achieved by presenting a map to the user, such that the user can simply circle the area where the SDVs are to arrive, as well as where the SDVs are to come from (i.e., the location from which the SDVs are to be dispatched) and/or any intermediate staging areas for the SDVs before they actually arrive at the designated area (final meeting/staging area).

In one or more embodiments of the present invention, the call for SDVs to arrive at a particular location is intertwined with an electronic calendar. For example, assume that an electronic calendar shows that a wedding will be held at Location A, and that 50 persons will need to be transported to the reception at Location B at 8:00 PM on 15 Sep. 2020. As such, the SDV controller 201 will automatically dispatch the required number of SDVs to Location A at 8:00 PM on 15 Sep. 2020 by issuing instructions to their respective SDV on-board computers 301.

Thus, as described herein, autonomous vehicles (SDVs) are communicatively connected to a centralized cloud server (e.g., SDV controller 201), thus giving them the capability of receiving movement communications and commands from the centralized cloud server.

An operator (e.g., of user device 455) is thus able to navigate any area for which he/she has permission by using video feeds or with the browsing of an area on an electronic map.

As depicted in FIG. 4, a user can perform freehand drawings on a display screen where the video feed or map is being displayed, and also can write instructive text or provide voice commands for any given targeted area, where a targeted area is any delineated (e.g., circled) area on the electronic map or video freeze frame.

The computer system then analyzes the image or video positions where the operator has drawn and, based on that drawing, will calculate geographic area ranges based on the overlaid boundary drawn. For example, in FIG. 4, the area of parking spots affected is circled on a frozen video feed of a mapped area. Based on the known global positioning system (GPS) location of the given map or video feed, the exact location of the parking spots that are circled will become known. It is that area that is given the specific instruction from the operator, and that information is stored in the centralized server and made available to any and all autonomous vehicles.

As depicted in FIG. 4, the operator can write text corresponding to the drawn area and accordingly the remote cloud server (SDV controller 201) will extract information from operator's device (e.g., user's device 455).

In one or more embodiments of the present invention, speech recognition is used to correspond to a given selected area. Such speech recognition is understood by machine learning and NLP in the same way as the written text is understood.

A contextual analysis of the user's directions is performed on the gathered data (i.e., location being delineated as well as the user's inputs for SDVs within that delineated area), and a rule is created using natural language processing (NLP).

NLP enables computers to derive meaning from natural language input stemming from any number of sources. For example, deep parsing breaks a sentence down into noun phrases and verb phrases and then figures the prepositional phrase. A triple is the functional decomposition of any sentence. The triple is composed of a subject→predicate→object. The predicate is the main verb of the sentence, the object is the direct object of that verb (the action recipient). The subject is verb agent; the one who carries out the action. By decomposing language into triples, the system can understand how entities relate to each other and navigate through unstructured text (e.g., via a triple store). Classification techniques are also used to understand sentences that are broken down. There are a variety of models that can be used to achieve classification, including but not limited to "Maximum Entropy" (max-ent) and "Deep Learning"/"Neural Net" models.

Lemmatization is one technique that can be applied to the stream in analyzing the input. Lemmatization is the process of grouping together different inflected forms of a word in order that it can be analyzed as a single item. This allows a better chance for the filters to work in spite of variations of input. For example, "walking", "walks", "walked" all have a lemma of "walk".

The interpreted rule will correspond to the given area for which the text or spoken word was purposed (e.g., the circled area). This interpreted rule is then communicated to each autonomous vehicles in the general vicinity, or to those autonomous vehicles that are targeting a given area. These instructions are expected to be followed by the autonomous vehicles.

For example, the circled area on the display (and thus the known locations of the parking spots in the circled area) come with an instruction to NOT park in those spots between the hours of 4:00 pm and 8:00 pm on 15 Sep. 2020 in the example shown in FIG. 4. Such SDVs' "see" a prohibited area and they automatically move on to a spot they can really park in.

In addition, if there are specific vehicles for which special instructions apply, those instructions that apply to them only will be provided only to them. That is, if the general public gets an instruction that prohibits them from parking in certain spots, authorized SDVs (e.g., in a motorcade) are able to "see" those spots as open, based on communications to them from the SDV controller 201 or the user's device 455.

In another embodiment, the solution presented herein is more general than specific. For example, instead of selecting the exact spaces for use by a motorcade, the operator may circle the entire parking lot and say "priority parking for the motorcade". The system could then figure out when the motorcade is arriving (e.g., from an electronic calendar) as an input and how many parking spaces are needed. At this point, the system would make sure to "block" the general public of autonomous cars (SDVs) from parking in those spots between the necessary hours, in order to ensure those spaces are free during those hours.

In one embodiment of the present invention, if parking spots are blocked during certain hours, cars may not be blocked from coming in but they will be warned of an upcoming prohibited time. If the user of the SDV elects to park there anyway and does not direct his/her SDV to move before the proscribed time, then the SDV will be autonomously moved to a new location. This new location is then provided to SDV that is authorized to park in the restricted parking spot. Alternatively, the restricted parking spot(s) are physically blocked to SDVs (which are not authorized to park in these parking spots during the prohibited time) by a movable physical barrier (e.g., a set of bollards that are mechanically raised according to instructions from a controller such as computer 101 shown in FIG. 1), other SDVs, etc. That is, physical barriers physically prevent unauthorized SDVs from entering the restricted parking spots.

Figure 5:
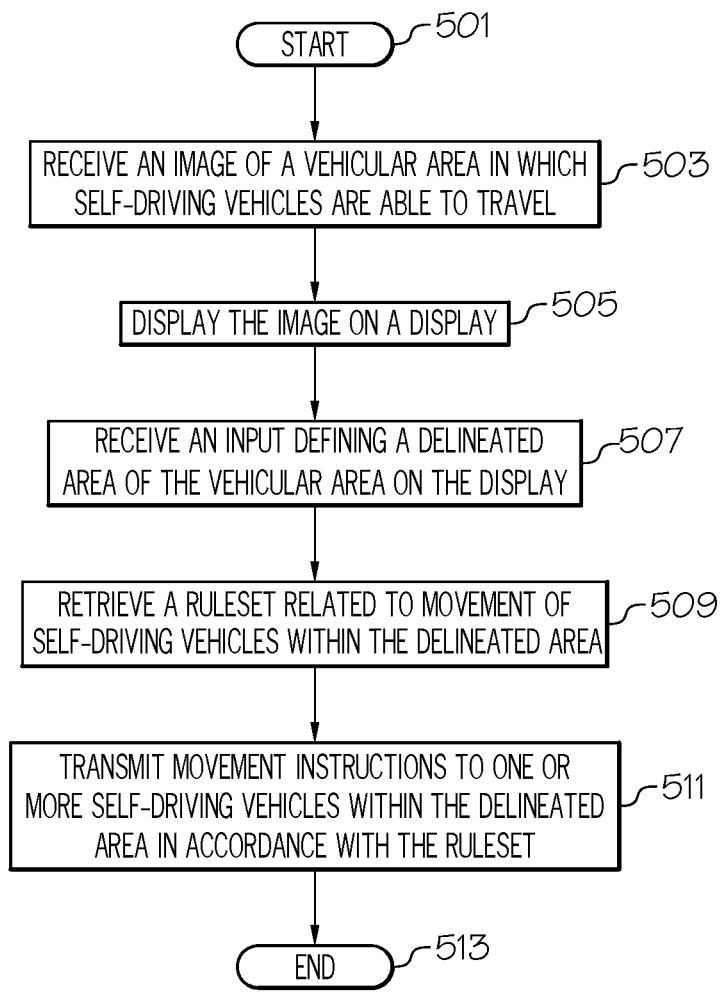
FIG. 5 is a high-level flow chart of one or more steps performed by one or more processors and/or other hardware devices to control movement of an SDV within a delineated vehicular area in accordance with one or more embodiments of the present invention.

With reference now to FIG. 5, a high-level flow chart of one or more steps performed by one or more processors and/or other hardware devices to control movement of an SDV within a delineated vehicular area in accordance with one or more embodiments of the present invention is presented.

After initiator block 501, one or more processors (e.g., within SDV controller 201 shown in FIG. 2) receive an image of a vehicular area (e.g., vehicular area 208) in which self-driving vehicles (e.g., SDVs 202/204/206) are able to travel, as described in block 503 of FIG. 5. As described herein this image may be a video image (either stored or in real-time from a video camera), or it may be a map of the vehicular area.

As described in block 505 of FIG. 5, the processor(s) display the image on a display. For example, processors within SDV controller 201 may send the image of the GUI 409 on the user device 455 shown in FIG. 4, directing the user device 455 to display the image of the vehicular area (e.g., the parking lot shown in FIG. 4).

As described in block 507 of FIG. 5, one or more processors (e.g., within SDV controller 201) receive an input (e.g., circle 402 shown in FIG. 4) defining a delineated area (e.g., the area within circle 402) of the vehicular area on the display.

As described in block 509 of FIG. 5, one or more processors (e.g., within SDV 201) retrieve a ruleset related to movement of self-driving vehicles within the delineated area. This ruleset may be previously stored and thus retrieved by the SDV controller 201, or they may be in the form of the input from the instruction box (e.g., instruction box 404) entered on the GUI 409 by the user.

As described in block 511 of FIG. 5, one or more processors (e.g., within SDV controller 201) transmit movement instructions to one or more self-driving vehicles (i.e., to their respective SDV on-board computers 301) within the delineated area in accordance with the ruleset. For example, the ruleset may be "vacate this space" based on the user's entry of "Clear this space now" (shown in FIG. 4), which cause the SDV controller 201 to send an instruction to the SDV on-board computer 301 to direct the SDV 410 to vacate that parking space.

Similarly, the SDV controller 201 can send instructions to one more SDVs to occupy the delineated area of the vehicular area at a predefined time period in accordance with the ruleset, as described in the motorcade example discussed above.

The flow chart shown in FIG. 5 ends at terminator block 513.

In an embodiment of the present invention, assume that vehicular area 208 is a parking lot (as shown in FIG. 4), and that the delineated area is one or more parking spaces in the parking lot. In this embodiment, the ruleset defines which specific self-driving vehicles are permitted to park in the one or more parking spaces at a predefined period of time. That is, certain SDVs may be blocked (e.g., a certain times) from parking in the area defined by circle 406 in FIG. 4, while others are permitted to park in that area during those times.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
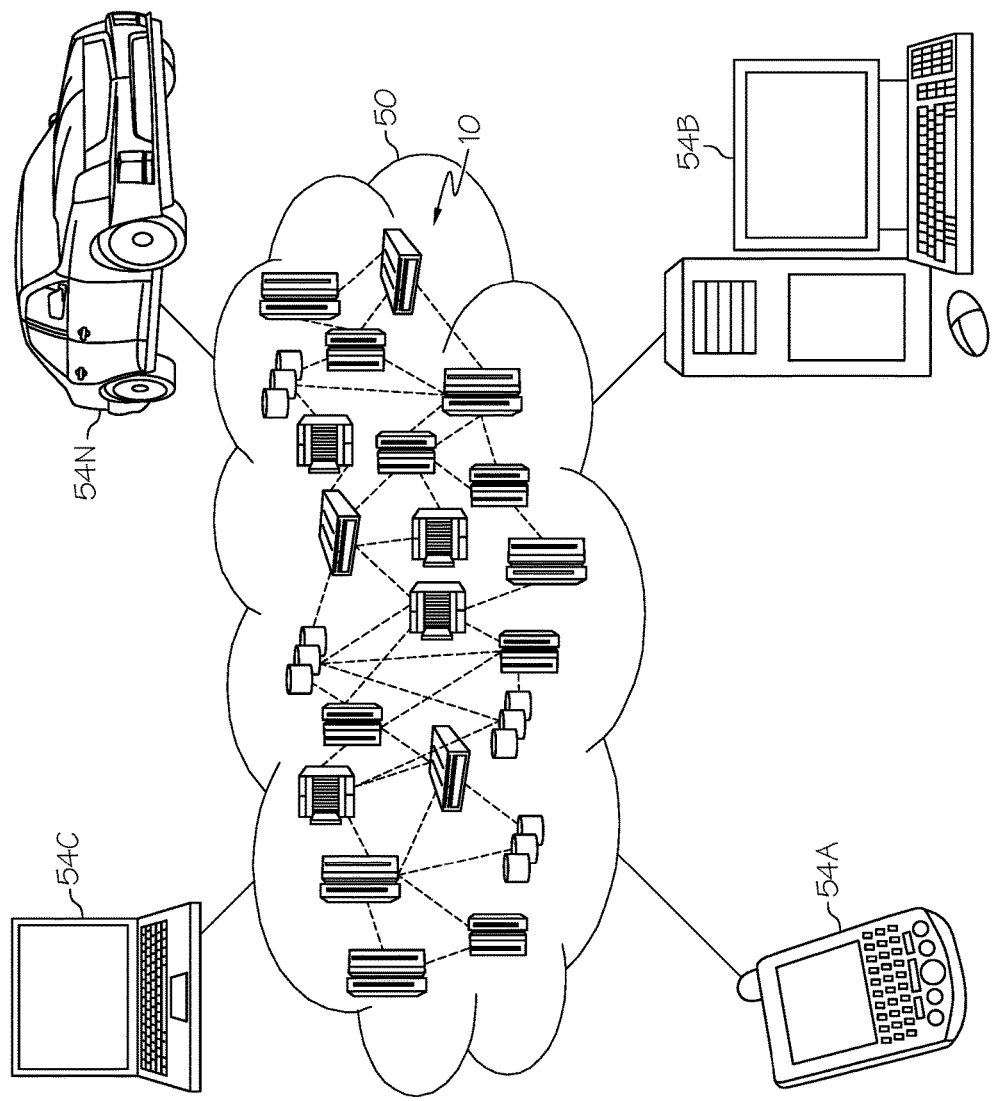
FIG. 6 depicts a cloud computing node according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
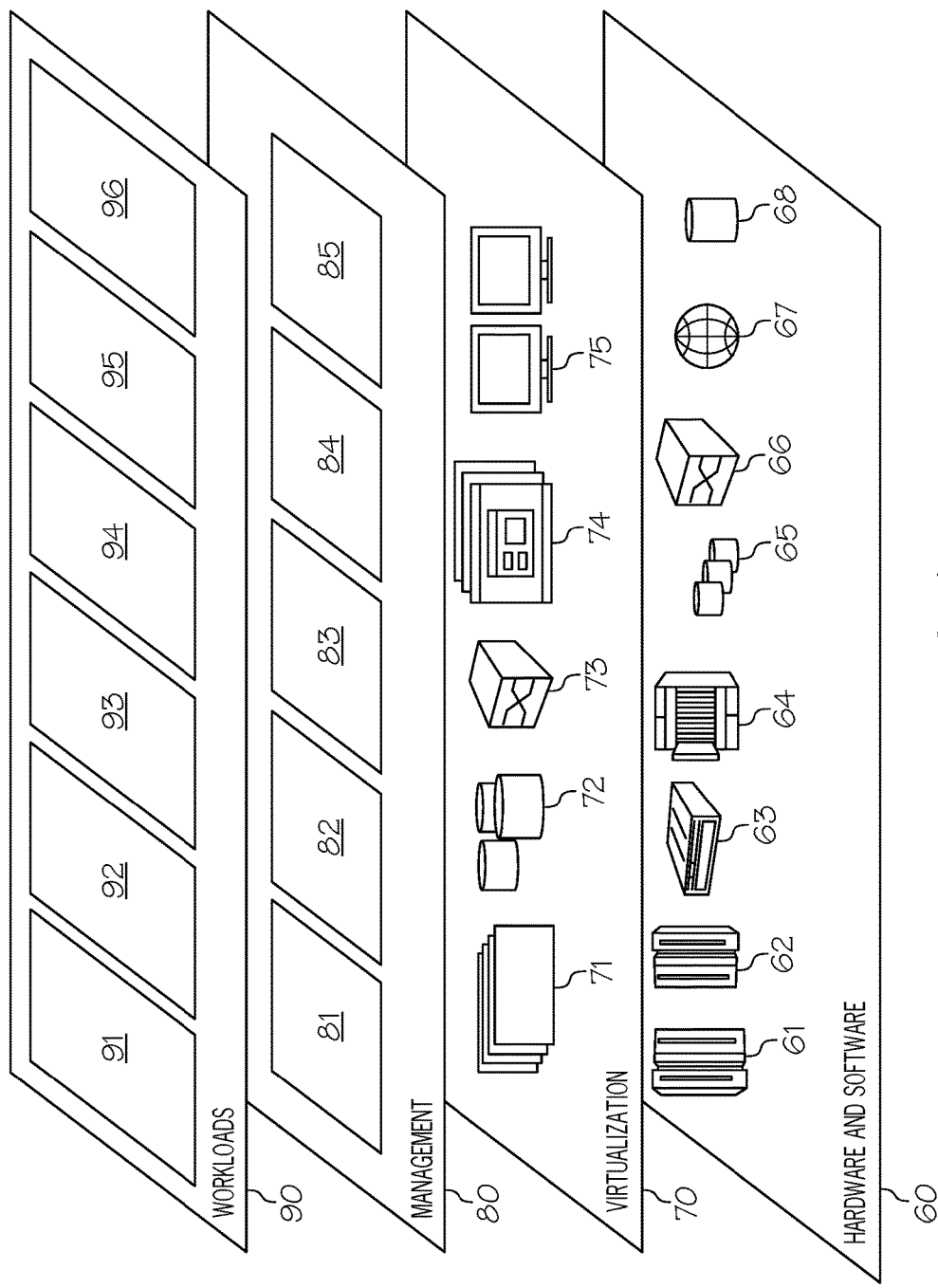
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   transmitting, from a self-driving (SDV) controlling server to a client computer, an image of a vehicular area in which self-driving vehicles are able to travel;
   transmitting, from the SDV controlling server to the client computer, instructions to display the image on a display of the client's computer;
   receiving, by the SDV controlling server, an input from the client's computer defining a delineated area of the vehicular area on the display, wherein the delineated area is specific for a particular parking spot in a parking lot, and wherein use of the parking lot is restricted to autonomous self-driving vehicles;
   in response to receiving the input defining the particular parking spot in the parking lot, receiving, by the SDV controlling server, a text input from the client's computer, wherein the text input is in natural language, wherein the text input describes a time that a particular SDV is required to park in the particular parking spot, wherein the text input describes a location from which the particular SDV is required to be dispatched from in order to be permitted to park in the particular parking spot, and wherein the text input describes a type of SDV that is authorized to park in the particular parking spot;

executing, by the SDV controlling server, natural language processing (NLP) to interpret the text input according to a context of the text input and a context of a location of the particular parking spot;

converting, by the SDV controlling server, the NLP interpreted text input into movement instructions that are executable by SDVs to maneuver the SDVs; and transmitting, from the SDV controlling server, the movement instructions to multiple self-driving vehicles within the parking lot, wherein the movement instructions direct a first self-driving vehicle to vacate the particular parking spot before the time that the particular SDV is required to park in the particular parking spot, wherein the movement instructions direct a second self-driving vehicle to prevent the second self-driving vehicle from entering the particular parking spot during the time that the particular SDV is required to park in the particular parking spot, and wherein the movement instructions direct the particular SDV to enter the particular parking spot during the time that the particular SDV is required to park in the particular parking spot, wherein the particular SDV is of the type of SDV that is authorized to park in the particular parking spot, and wherein the particular SDV has been dispatched from the location from which the particular SDV is required to be dispatched from in order to be permitted to park in the particular parking spot.

2. The method of claim 1, wherein the type of SDV that is authorized to park in the particular parking spot is a passenger SDV.

3. The method of claim 1, wherein the image of the vehicular area is a photographic image of the vehicular area.

4. The method of claim 1, wherein the image of the vehicular area is a map of the vehicular area.

5. A computer program product comprising one or more non-transitory computer readable storage mediums, and program instructions stored on at least one of the one or more non-transitory storage mediums, the stored program instructions comprising:

program instructions to transmit to a client computer an image of a vehicular area in which self-driving vehicles are able to travel;

program instructions to transmit instructions to the client computer to display the image on a display;

program instructions to receive an input from the client computer defining a delineated area of the vehicular area on the display, wherein the delineated area is specific for a particular parking spot in a parking lot, and wherein use of the parking lot is restricted to autonomous self-driving vehicles;

program instructions to, in response to receiving the input defining the particular parking spot in the parking lot, receive a text input from the client's computer, wherein the text input is in natural language, wherein the text input describes a time that a particular SDV is required to park in the particular parking spot, wherein the text input describes a location from which the particular SDV is required to be dispatched from in order to be permitted to park in the particular parking spot, and wherein the text input describes a type of SDV that is authorized to park in the particular parking spot;

program instructions to execute natural language processing (NLP) to interpret the text input according to a context of the text input and a context of a location of the particular parking spot;

program instructions to convert the NLP interpreted text input into movement instructions that are executable by SDVs to maneuver the SDVs; and program instructions to transmit the movement instructions to multiple self-driving vehicles within the parking lot, wherein the movement instructions direct a first self-driving vehicle to vacate the particular parking spot before the time that the particular SDV is required to park in the particular parking spot, wherein the movement instructions direct a second self-driving vehicle to prevent the second self-driving vehicle from entering the particular parking spot during the time that the particular SDV is required to park in the particular parking spot, and wherein the movement instructions direct the particular SDV to enter the particular parking spot during the first time period, wherein the particular SDV is of the type of SDV that is authorized to park in the particular parking spot, and wherein the particular SDV has been dispatched from the location from which the particular SDV is required to be dispatched from in order to be permitted to park in the particular parking spot.

6. The computer program product of claim 5, wherein the image of the vehicular area is a photographic image of the vehicular area.

7. The computer program product of claim 5, wherein the image of the vehicular area is a map of the vehicular area.

8. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to transmit to a client computer an image of a vehicular area in which self-driving vehicles are able to travel;

program instructions to transmit instructions to the client computer to display the image on a display;

program instructions to receive an input from the client computer defining a delineated area of the vehicular area on the display, wherein the delineated area is specific for a particular parking spot in a parking lot, and wherein use of the parking lot is restricted to autonomous self-driving vehicles;

program instructions to, in response to receiving the input defining the particular parking spot in the parking lot, receive a text input from the client's computer, wherein the text input is in natural language, wherein the text input describes a time that a particular SDV is required to park in the particular parking spot, wherein the text input describes a location from which the particular SDV is required to be dispatched from in order to be permitted to park in the particular parking spot, and wherein the text input describes a type of SDV that is authorized to park in the particular parking spot;

program instructions to execute natural language processing (NLP) to interpret the text input according to a context of the text input and a context of a location of the particular parking spot;

program instructions to convert the NLP interpreted text input into movement instructions that are executable by SDVs to maneuver the SDVs; and program instructions to transmit the movement instructions to multiple self-driving vehicles within the parking lot, wherein the movement instructions direct a first self-driving vehicle to vacate the particular parking spot before the time that the particular SDV is required to park in the particular parking spot, wherein the movement instructions direct a second self-driving vehicle to prevent the second self-driving vehicle from entering the particular parking spot during the time that the particular SDV is required to park in the particular parking spot, and wherein the movement instructions direct the particular SDV to enter the particular parking spot during the time that the particular SDV is required to park in the particular parking spot, wherein the particular SDV is of the type of SDV that is authorized to park in the particular parking spot, and wherein the particular SDV has been dispatched from the location from which the particular SDV is required to be dispatched from in order to be permitted to park in the particular parking spot.

9. The computer system of claim 8, wherein the image of the vehicular area is a photographic image of the vehicular area.

* * * * *